US012598509B2

(12) United States Patent
Zhang et al.

(10) Patent No.: US 12,598,509 B2
(45) Date of Patent: Apr. 7, 2026

(54) METHOD FOR ALIGNMENT OF MINIMIZATION DRIVE TEST AND QUALITY OF EXPERIENCE MEASUREMENT

(71) Applicant: ZTE Corporation, Shenzhen (CN)

(72) Inventors: Man Zhang, Shenzhen (CN); Yin Gao, Shenzhen (CN); Dapeng Li, Shenzhen (CN); Zhuang Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 359 days.

(21) Appl. No.: 18/326,417

(22) Filed: May 31, 2023

(65) Prior Publication Data

US 2023/0308942 A1 Sep. 28, 2023

Related U.S. Application Data

(63) Continuation of application No. PCT/CN2021/139781, filed on Dec. 20, 2021.

(51) Int. Cl.
*H04W 4/00* (2018.01)
*H04W 24/10* (2009.01)
*H04W 28/02* (2009.01)

(52) U.S. Cl.
CPC ....... *H04W 28/0289* (2013.01); *H04W 24/10* (2013.01)

(58) Field of Classification Search
CPC .......................... H04W 28/02; H04W 28/0289
See application file for complete search history.

(56) References Cited

U.S. PATENT DOCUMENTS

| | | | | |
|---|---|---|---|---|
| 2011/0183661 A1* | 7/2011 | Yi | ......................... | H04W 24/10 |
| | | | | 455/422.1 |
| 2011/0269402 A1* | 11/2011 | Yi | ......................... | H04W 24/08 |
| | | | | 455/67.11 |
| 2012/0088457 A1* | 4/2012 | Johansson | ............. | H04W 24/10 |
| | | | | 455/67.11 |
| 2013/0114446 A1* | 5/2013 | Liu | ...................... | H04W 24/10 |
| | | | | 370/252 |

(Continued)

FOREIGN PATENT DOCUMENTS

| | | | | | |
|---|---|---|---|---|---|
| CN | | 115250490 A | * | 10/2022 | ............ H04W 24/02 |
| CN | | 117882432 A | * | 4/2024 | ............ H04W 24/02 |
| WO | WO 2021/028397 A1 | | | 2/2021 | |
| WO | WO 2021/098074 A1 | | | 5/2021 | |
| WO | WO-2022086386 A1 | * | | 4/2022 | ............ H04L 43/20 |

OTHER PUBLICATIONS

Johansson et al., Minimization of Drive Tests in 3GPP Release 11, Nov. 2012, IEEE Communications Magazine, pp. 36-43. (Year: 2012).*

(Continued)

*Primary Examiner* — Elisabeth Benoit Magloire
(74) *Attorney, Agent, or Firm* — Crowell & Moring LLP

(57) ABSTRACT

A wireless communication method for use in a wireless network node is disclosed. The method includes transmitting, to a measurement collection entity, minimization drive test (MDT) reports and quality of experience (QoE) reports. A QoE reporting is suspended in response to an overload situation. A transmission to a second wireless network node includes a suspension indication associated with a suspension of the QoE reporting.

18 Claims, 11 Drawing Sheets

(56) References Cited

U.S. PATENT DOCUMENTS

| 2014/0287694 | A1* | 9/2014 | Kim ..................... H04W 64/00 |
| | | | 455/67.11 |
| 2018/0041913 | A1 | 2/2018 | Zhu et al. |
| 2021/0385691 | A1 | 12/2021 | Johansson et al. |
| 2023/0362693 | A1* | 11/2023 | Hong ............... H04W 72/0446 |
| 2024/0064072 | A1* | 2/2024 | Lunardi ............. H04L 41/0806 |

OTHER PUBLICATIONS

International Search Report and Written Opinion received for Application No. PCT/CN2021/139781 mailed Jul. 29, 2022 (36 pages).

ZTE et.al. "R3-215667 Further discussion on alignment of MDT and QoE Measurements" *3GPP TSG-RAN WG3* #114-e, vol., No., Nov. 1-11, 2021 (6 pp.).

Ericsson. "R3-21191—The Alignment of Radio-Related Measurements and QoE Measurements" *3GPP TSG-RAN WG Meeting* #112-e, vol., No., May 17-27, 2021 (3 pp.).

ZTE et.al. "R3-212449 Alignment of MDT and QoE Measurements" *3GPP TSG-RAN WG3* #112-e, vol. No., May 17-28, 2021 (7 pp.).

European Search Report issued for European Patent Application No. 21 964 972.0 dated Jul. 18, 2024 (14 pp.).

Ericsson. "R3-210527—pCR for TR 38.890: Handling of QoE Measurement and Reporting and Support for New Services," *3GPP TSG-RAN WG3 Meeting* #111-e, Online, Jan. 25, Feb. 4, 2021 (11 pp.).

* cited by examiner

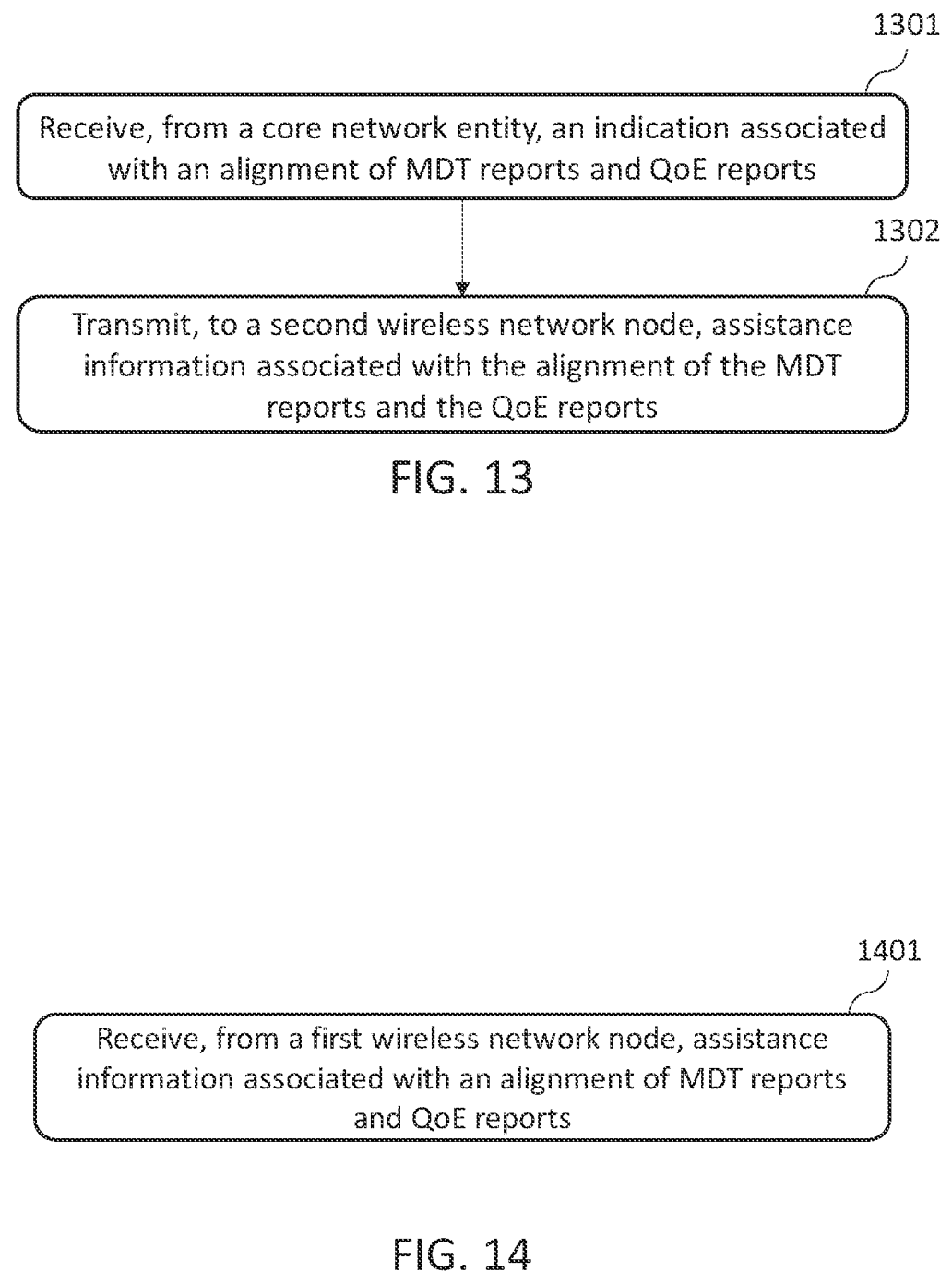

1301

Receive, from a core network entity, an indication associated with an alignment of MDT reports and QoE reports

1302

Transmit, to a second wireless network node, assistance information associated with the alignment of the MDT reports and the QoE reports

Receive, from a first wireless network node, assistance information associated with an alignment of MDT reports and QoE reports

FIG. 14

METHOD FOR ALIGNMENT OF MINIMIZATION DRIVE TEST AND QUALITY OF EXPERIENCE MEASUREMENT

PRIORITY

This application claims priority as a Continuation of PCT/CN2021/139781, filed on Dec. 20, 2021, entitled "METHOD FOR ALIGNMENT OF MINIMIZATION DRIVE TEST AND QUALITY OF EXPERIENCE MEASUREMENT", the entirety of which is incorporated herein by reference.

TECHNICAL FIELD

This document is directed generally to wireless communications, and in particular to 5th generation (5G) communications.

BACKGROUND

The Quality-of-Experience (QoE) measurements are collected in an application layer and reflect user experience. The QoE reports collected at a user equipment (UE) are sent to a measurement collection entity (MCE) for analysis. Minimization drive test (MDT) reports collected at radio access network (RAN) side may be useful for the QoE analysis in the MCE. Thus, the MDT may be aligned with the QoE measurement for the QoE analysis.

SUMMARY

This disclosure provides a method for MDT alignment with QoE in the case that QoE reporting has been paused, in DC, CU-DU split and CP-UP split architectures.

This document relates to methods, systems, and devices for the alignment of the MDT and the QoE (measurement) in various network architectures (e.g. configurations).

The present disclosure relates to a wireless communication method for use in a first wireless network node. The method comprises: transmitting, to a measurement collection entity, minimization drive test, MDT, reports and quality of experience, QoE, reports; suspending a QoE reporting in response to an overload situation, and transmitting, to a second wireless network node, a suspension indication associated with a suspension of the QoE reporting.

Various embodiments may In some embodiments implement the following features.

In some embodiments, the wireless communication method further comprises receiving, from the second wireless network node, a response message associated with a suspension of transmitting the MDT reports to the measurement collection entity.

In some embodiments, the wireless communication method further comprises resuming the QoE reporting, and transmitting, to the second wireless network node, a resumption indication associated a resumption of the QoE reporting.

In some embodiments, the wireless communication method further comprises receiving, from the second wireless network node, a response message associated with a resumption of transmitting the MDT reports to the measurement collection entity.

In some embodiments, the first wireless network node is one of a master node and a secondary node in a dual connectivity configuration and the second wireless network node is another one of the master node and the secondary node.

In some embodiments, the wireless communication method further comprises receiving, from a core network entity, an indication associated with an alignment of the MDT reports and the QoE reports, and transmitting, to the second wireless network node, assistance information associated with the alignment of the MDT reports and the QoE reports.

In some embodiments, the indication comprises at least one of: an MDT trace identifier associated with the MDT reports, or at least one type of measurement results comprised in the MDT reports.

In some embodiments, the assistance information comprises at least one of: an MDT trace identifier associated with the MDT reports, at least one type of measurement results comprised in the MDT reports, or an address of the measurement collection entity.

In some embodiments, the at least one type of measurement results comprises at least one of: at least one downlink signal quantity, a power headroom, a packet data convergence protocol service data unit data volume, a packet delay, a packet loss rate, a received signal strength indicator, or a round trip time.

In some embodiments, the first wireless network node is a centralized unit of a radio access network node and the second wireless network node is a distributed unit of the radio access network node.

In some embodiments, the first wireless network node is a control plane in a centralized unit of a radio access network node and the second wireless network node is a user plane in the centralized unit of the radio access network node.

The present disclosure relates to a wireless communication method for use in a second wireless network node. The method comprises:

transmitting, to a measurement collection entity, minimization drive test, MDT, reports, receiving, from a first wireless network node, a suspension indication associated with a suspension of quality of experience, QoE, reporting, and stopping transmitting the MDT reports to the measurement collection entity.

Various embodiments may In some embodiments implement the following features:

In some embodiments, the wireless communication method further comprises transmitting, to the first wireless network node, a response message associated with a suspension of transmitting the MDT reports to the measurement collection entity.

In some embodiments, the wireless communication method further comprises receiving, from the first wireless network node, a resumption indication associated with a resumption of the QoE reporting, and resuming transmitting the MDT reports to the measurement collection entity.

In some embodiments, the wireless communication method further comprises transmitting, to the first wireless network node, a response message associated with a resumption of transmitting the MDT reports to the measurement collection entity.

In some embodiments, the first wireless network node is one of a master node and a secondary node in a dual connectivity configuration and the second wireless network node is another one of the master node and the secondary node.

In some embodiments, the wireless communication method further comprises receiving, from the first wireless network node, assistance information associated with an alignment of the MDT reports and QoE reports, wherein the MDT reports are transmitted to the measurement collection entity based on the assistance information.

In some embodiments, the assistance information comprises at least one of: an MDT trace identifier associated with the MDT reports, at least one type of measurement results comprised in the MDT reports, or an address of the measurement collection entity.

In some embodiments, the at least one type of measurement results comprises at least one of: at least one downlink signal quantity, a power headroom, a packet data convergence protocol service data unit data volume, a packet delay, a packet loss rate, a received signal strength indicator, or a round trip time.

In some embodiments, the first wireless network node is a centralized unit of a radio access network node and the second wireless network node is a distributed unit of the radio access network node.

In some embodiments, the first wireless network node is a control plane in a centralized unit of a radio access network node and the second wireless network node is a user plane in the centralized unit of the radio access network node.

The present disclosure relates to a first wireless network node. The first wireless network node comprises: a communication unit, configured to transmit, to a measurement collection entity, minimization drive test, MDT, reports and quality of experience, QoE, reports, and a processor, configured to suspend a QoE reporting in response to an overload situation, wherein the communication unit is further configured to transmit, to a second wireless network node, a suspension indication associated with a suspension of the QoE reporting.

Various embodiments may, in some embodiments, implement the following features.

In some embodiments, the processor is further configured to perform any of the aforementioned wireless communication methods.

The present disclosure relates to a second wireless network node. The second wireless network node comprises: a communication unit, configured to: transmit, to a measurement collection entity, minimization drive test, MDT, reports; receive, from a first wireless network node, a suspension indication associated with a suspension of quality of experience, QoE, reporting; and a processor, configured to stop transmitting the MDT reports to the measurement collection entity.

Various embodiments may In some embodiments implement the following features. In some embodiments, the processor is further configured to perform any of the aforementioned wireless communication methods.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 13 shows a flowchart of a method according to an embodiment of the present disclosure.

FIG. 14 shows a flowchart of a method according to an embodiment of the present disclosure.

DETAILED DESCRIPTION

Figure 1:
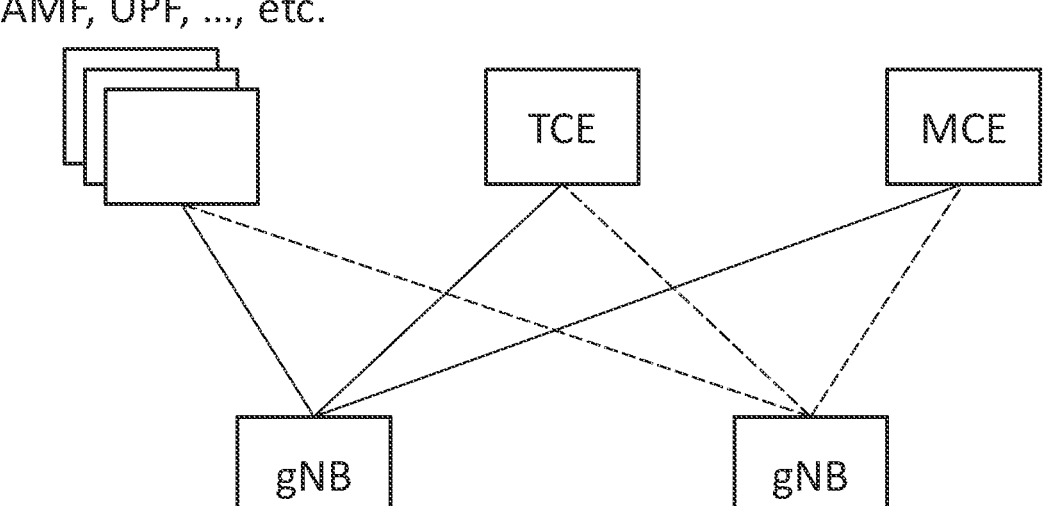
FIG. 1 shows a schematic diagram of a network according to an embodiment of the present disclosure.

FIG. 1 shows a schematic diagram of a network (architecture) according to an embodiment of the present disclosure. In FIG. 1, the network comprises the following network functions/entities:

gNB: In the present disclosure, the gNB may be equal to a base station, a radio access network (RAN), a RAN node or a next generation RAN (NG-RAN) (node). In an embodiment of a multi-radio-access-technology dual connectivity (MR-DC) architecture/configuration), the gNB may be a master node (MN) of the MR-DC architecture/configuration or a secondary node of the MR-DC architecture/configuration. In an embodiment of a CU-DU (centralized unit-distributed unit) split architecture (configuration), the gNB may be a CU of the gNB or a DU of the gNB. In an embodiment of a CP-UP (control plane-user plane) architecture (configuration), the gNB may be a CP of a gNB-CU (i.e. gNB-CU-CP) or a UP of a gNB-CU (i.e. gNB-CU-UP).

TCE: Trace Collection Entity. The TCE is configured to receive MDT reports from the gNB(s) and perform analysis on the received MDT reports. For example, the TCE may be server(s) configured to perform analysis on collected data.

MCE: Measurement Collection Entity. The MCE is configured to receive QoE reports (QoE measurement results) from the gNB(s) and perform analysis on the received QoE reports. For instance, the MCE may be server(s) configured to perform analysis on collected data.

The gNB shown in FIG. 1 may further connect to/communicate with user equipment (UE) and/or other network entities in the network, such as access and mobility management function (AMF), session management function (SMF), user plane function (UPF), core network (CN), application function (AF), policy control function (PCF), operations administration and maintenance (OAM), . . . , etc.

Radio-related measurements may be collected via immediate MDT for all types of supported services and collected for a purpose of QoE analysis. The immediate MDT may be configured before the QoE measurement being configured or these two could be configured simultaneously. The TCE/MCE is responsible for a correlation of the immediate MDT results and the QoE measurement results collected at the same UE. The NG-RAN (e.g. gNB) may include time stamp information and related identifier (ID) information in the MDT results and the QoE measurement results for the MCE/TCE, to enable the correlation of corresponding measurement results of the MDT and the QoE.

In the dual connection (DC) architecture, both the MN and the SN can collect the MDT measurement results and send the MDT measurement results to the TCE. In the CU-DU split architecture, both the CU and the DU can collect a part of MDT measurement results and send the collected MDT measurement results to the TCE. In the CP-UP split architecture, both the gNB-CU-CP and the gNB-CU-UP can collect at least part of MDT measurement results and send the collected MDT measurement results to the TCE for the MDT analysis. In the QoE management, if the MDT reports are configured to be used for the QoE analysis, the MDT reports collected in the MN/SN, the gNB-DU and the gNB-CU-UP need to be transmitted to the MCE for being aligned with corresponding QoE measurement results/reports.

Figure 2:
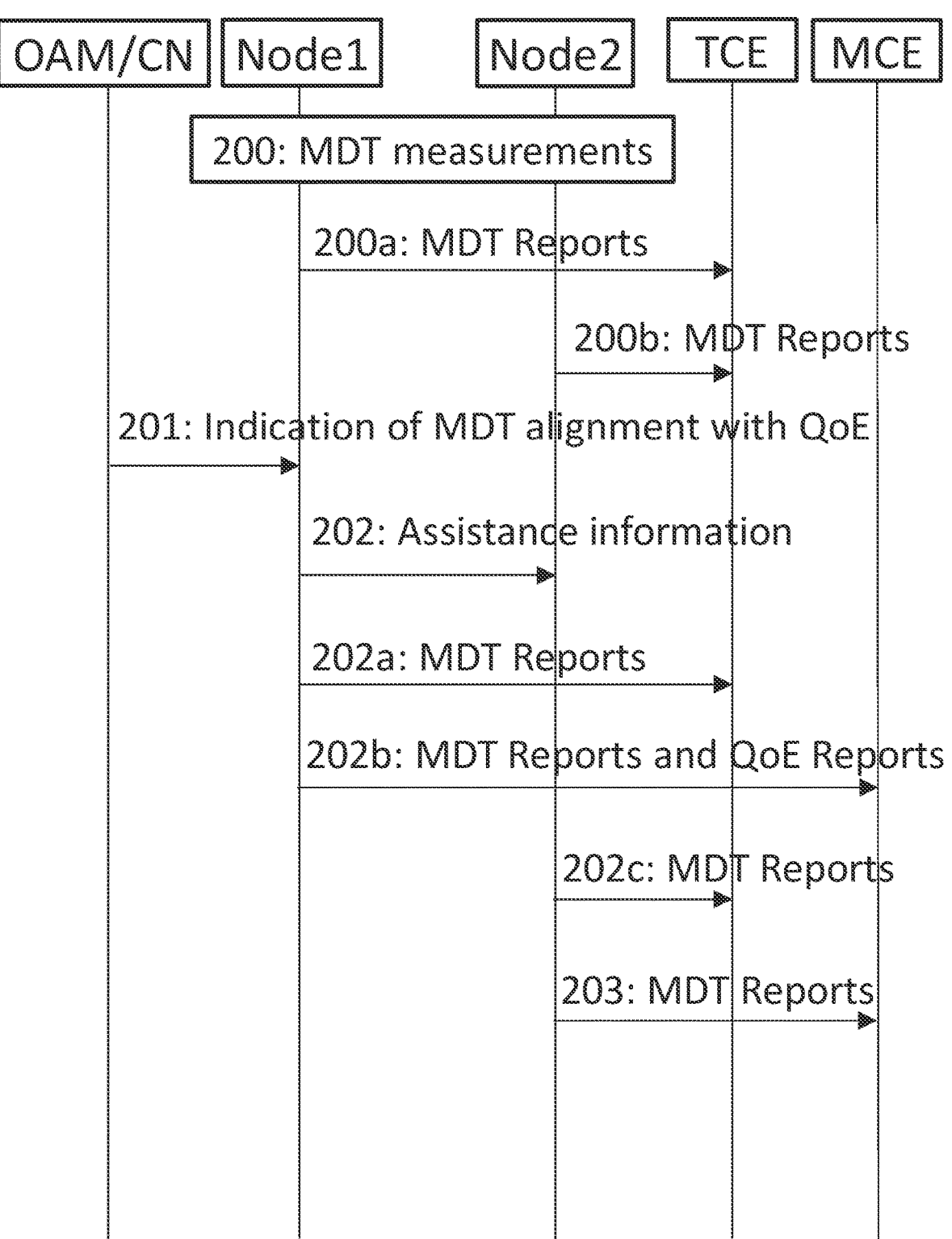
FIG. 2 shows a schematic diagram of a process according to an embodiment of the present disclosure.

FIG. 2 shows a schematic diagram of a process associated with an alignment of the MDT and the QoE in an MR-DC scenario according to an embodiment of the present disclosure. In this embodiment, the Node1 may be one of the MN and the SN in the MR-DC architecture (configuration) and the Node2 may be another one of the MN and the SN. Specifically, the process shown in FIG. 2 comprises:

Step 200: The MDT is configured in the MR-DC architecture, the Node1 and Node2 perform MDT measurements according to MDT configuration(s).

Step 200a: The Node1 collects MDT reports and sends the MDT reports to the TCE.

Step 200b: The Node2 collects MDT reports and sends the MDT reports to the TCE. Note that the MDT reports transmitted by the MN may comprise the MDT measurement results collected at the MN and/or at least part of the MDT reports transmitted from the SN to the MN.

In one embodiment, steps 200, 200a and 200b may be omitted.

Step 201: The OAM/CN sends, to the Node1, a QoE configuration which carries an indication for an alignment of the MDT and the QoE. In an embodiment, the indication includes at least one of the following items:
an MDT Trace identifier (ID)
at least one measurement result needed for the QoE analysis Step 202: The Node1 sends, to the Node2, assistance information through an Xn Application Protocol (XnAP) message, to indicate/instruct the Node2 to transmit the MDT reports to the MCE. In an embodiment, the assistance information includes at least one of the following items:
an MDT Trace ID;
at least one MDT measurement result needed for the QoE analysis; or
an internet protocol (IP) address of the MCE.

Step 202a: The Node1 sends the MDT reports to the TCE for the MDT analysis.

Step 202b: The Node1 sends the MDT reports collected at the Node1 and QoE reports from related user equipment (UE) together to the MCE. Note that the MDT reports and the QoE reports are sent with time information added based on the same clock.

In an embodiment, the MDT reports may be collected at the Node1 or received from the Node2.

Step 202c: The Node2 sends the MDT reports to the TCE for the MDT analysis.

Step 203: According to (or in response to) the assistance information, the Node2 sends the MDT reports to the MCE for the QoE analysis.

Figure 3:
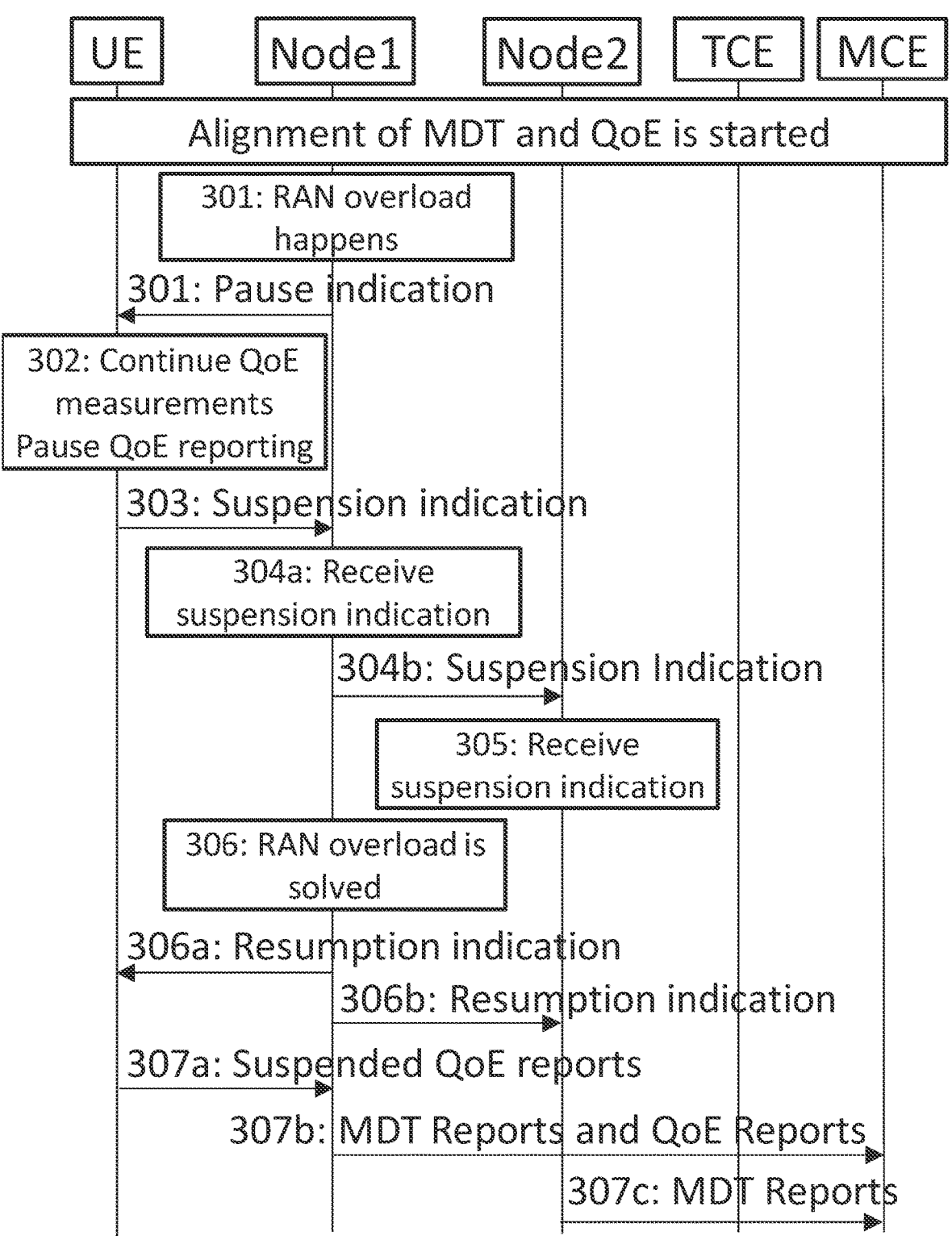
FIG. 3 shows a schematic diagram of a process according to an embodiment of the present disclosure.

FIG. 3 shows a schematic diagram of an alignment of the MDT and the QoE (measurements) in the MR-DC scenario according to an embodiment of the present disclosure. In FIG. 3, the QoE (reporting) may be paused for certain reasons. Note that the Node1 may be one of an MN and an SN in an MR-DC architecture (configuration) and the Node2 is another one of the MN and the SN.

In FIG. 3, the alignment of the MDT and the QoE (measurement) is started/enabled/triggered. For example, the alignment of the MDT and the QoE may be started by the process shown in FIG. 2.

The following steps show how the network handles the alignment of the MDT with QoE when the QoE reporting is paused, e.g., in an (RAN) overload situation.

Step 301: The RAN overload situation happens in Node1. In this embodiment, the Node1 hosts the QoE configurations. Once (detecting/determining that) the RAN overload happens, the Node1 sends a pause indication to the UE, to notify UE of the RAN overload situation in the RAN node and indicate the UE to suspend the reporting of at least one QoE measurement (i.e. QoE reporting).

Step 302: The UE receives the pause indication from the Node1. In this embodiment, the UE may continue ongoing measurement(s) in the application layer. In addition, the QoE reporting at an access stratum (AS) layer is suspended according to the pause indication.

Step 303: When or after the QoE reporting is suspended at the AS layer, the UE sends a radio resource control (RRC) layer message to the Node1, to indicate the suspension of the QoE reporting.

Step 304a: After the Node1 receives the suspension indication from the UE, the Node1 continues sending the MDT reports to the TCE and suspends the reporting of MDT measurement results to the MCE.

Step 304*b*: The Node1 sends a suspension indication associated with the suspension of the QoE reporting through an XnAP message, to notify the Node2 of the suspension of the QoE report. Based on the suspension indication, the Node2 may also suspend the MDT reporting to the MCE.

Step 305: After receiving the suspension indication of QoE report from Node1, the Node2 continues sending the MDT reports to the TCE and suspends reporting the MDT measurement results (i.e. MDT reports) to the MCE.

Step 306: After a certain period, the overload situation at the Node1 is solved.

Step 306*a*: The Node1 sends a resumption indication to the UE, to ask the UE to send the QoE reports that were suspended during the RAN overload.

Step 306*b*: The Node1 sends a resumption indication associated with the resumption of the QoE reporting through an XnAP message, to notify the Node2 the resumption of the QoE reporting. Based on the resumption indication, the Node2 may also resume reporting/transmitting the MDT reports to the MCE.

Step 307*a*: After the UE receives the resume indication from the Node1, the UE sends the suspended QoE reports to the Node1. The Node1 sends the MDT reports collected at the RAN node(s) (i.e. Node1 and/or Node2) and the QoE reports received from the UE together to the MCE. Note that the MDT reports and the QoE reports comprise the time information added based on the same clock.

Step 307*b*: After receiving the resume indication from the Node1, the Node2 resumes sending the MDT reports to the MCE.

Figure 4:
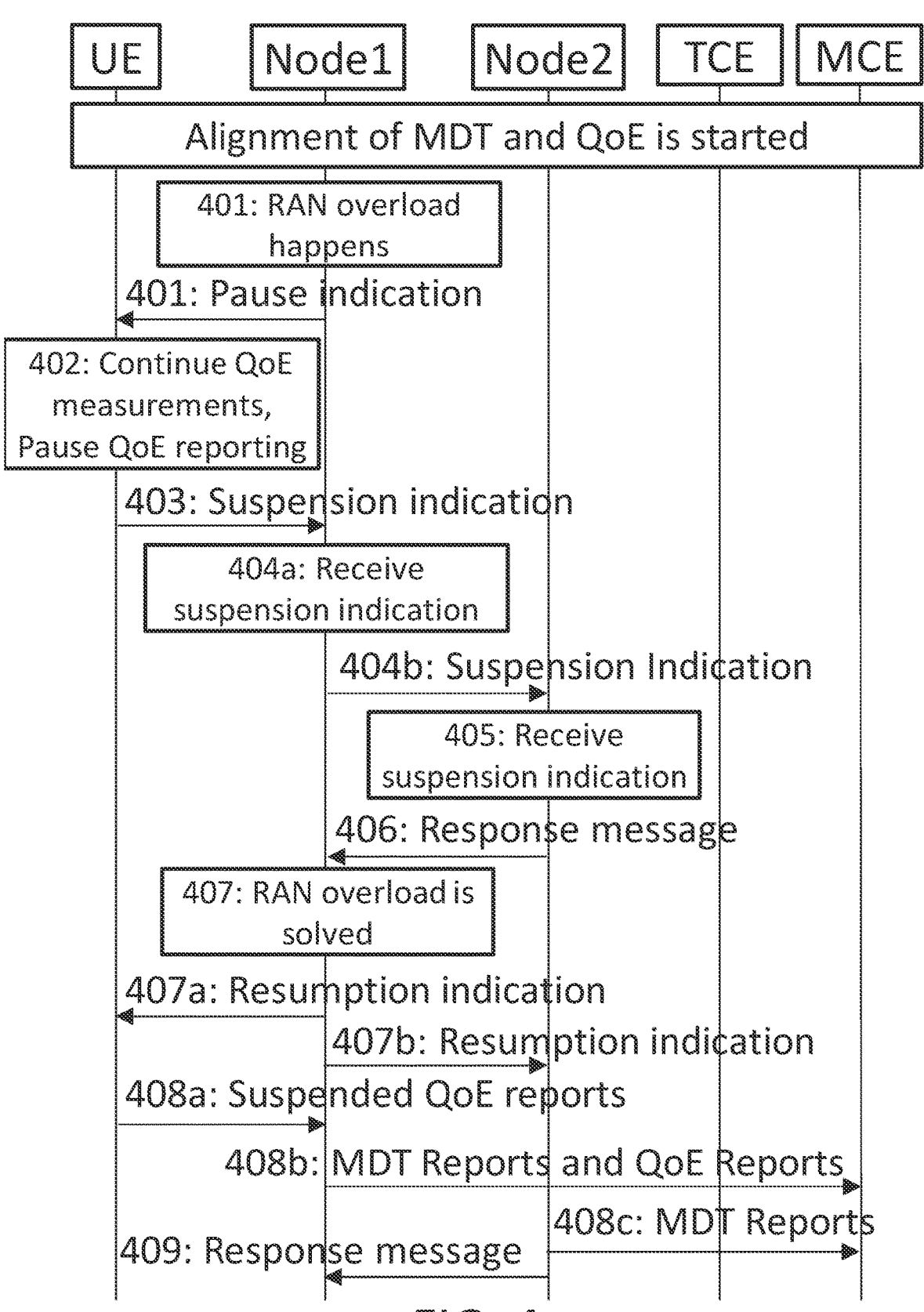
FIG. 4 shows a schematic diagram of a process according to an embodiment of the present disclosure.

FIG. 4 shows a schematic diagram of an alignment of the MDT and the QoE (measurements) in the MR-DC scenario according to an embodiment of the present disclosure. In FIG. 4, the QoE (reporting) may be paused. Note that the Node1 may be one of an MN and an SN in an MR-DC architecture (configuration) and the Node2 is another one of the MN and the SN.

In FIG. 4, the alignment of the MDT and the QoE is started/enabled/triggered. For example, the alignment of the MDT and the QoE may be started by the process shown in FIG. 2.

The following steps show how the network handles the alignment of the MDT with QoE when the QoE reporting is paused, e.g., in an (RAN) overload situation.

Step 401: The RAN overload situation happens in Node1. In this embodiment, the Node1 hosts the QoE configurations. Once (detecting/determining) the RAN overload happens, the Node1 sends a pause indication to the UE, to notify UE of the RAN overload situation in the RAN node and indicate the UE to suspend the reporting of at least one QoE measurement (i.e. QoE reporting).

Step 402: The UE receives the pause indication from the Node1. In this embodiment, the UE may continue ongoing measurement(s) in an application layer. In addition, QoE reporting at the AS layer is suspended according to the pause indication.

Step 403: When or after the QoE reporting is suspended at the AS layer, the UE sends an RRC layer message to the Node1, to indicate the suspension of the QoE reporting.

Step 404*a*: After the Node1 receives the suspension indication from the UE, the Node1 continues sending the MDT reports to the TCE and suspends the reporting of MDT measurement results to the MCE.

Step 404*b*: The Node1 sends a suspension indication associated with the suspension of the QoE reporting through an XnAP message, to notify the Node2 of the suspension of the QoE reporting. Based on the suspension indication, the Node2 may also suspend the MDT reporting to the MCE.

Step 405: After receiving the suspension indication of the QoE reporting from Node1, the Node2 continues sending the MDT reports to the TCE and suspends reporting the MDT measurement results (i.e. MDT reports) to the MCE.

Step 406: The Node2 sends a response message to the Node1 over the XnAP, to notify Node1 that the MDT reporting to the MCE has been suspended too.

Step 407: After a period, the overload situation at the Node1 is solved.

Step 407*a*: The Node1 sends a resumption indication to the UE, to ask the UE to send the QoE reports that were suspended during the RAN overload.

Step 407*b*: The Node1 sends a resumption indication associated with the resumption of the QoE reporting through an XnAP message, to notify the Node2 the resumption of the QoE reporting. Based on the resumption indication, the Node2 may also resume reporting the MDT reports to the MCE.

Step 408*a*: After the UE receives the resume indication from the Node1, the UE sends the suspended QoE reports to the Node1. The Node1 sends the MDT reports collected at the RAN node(s) (i.e. Node1 and/or Node2) and the QoE reports received from the UE together to the MCE. Note that the MDT reports and the QoE reports comprise the time information added based on the same clock.

Step 408*b*: After receiving the resume indication from the Node1, the Node2 resumes sending the MDT reports to the MCE.

Step 409: The Node2 sends a response message to the Node1 over the XnAP, to notify the Node1 of that the MDT reporting to the MCE has been resumed.

Figure 5:
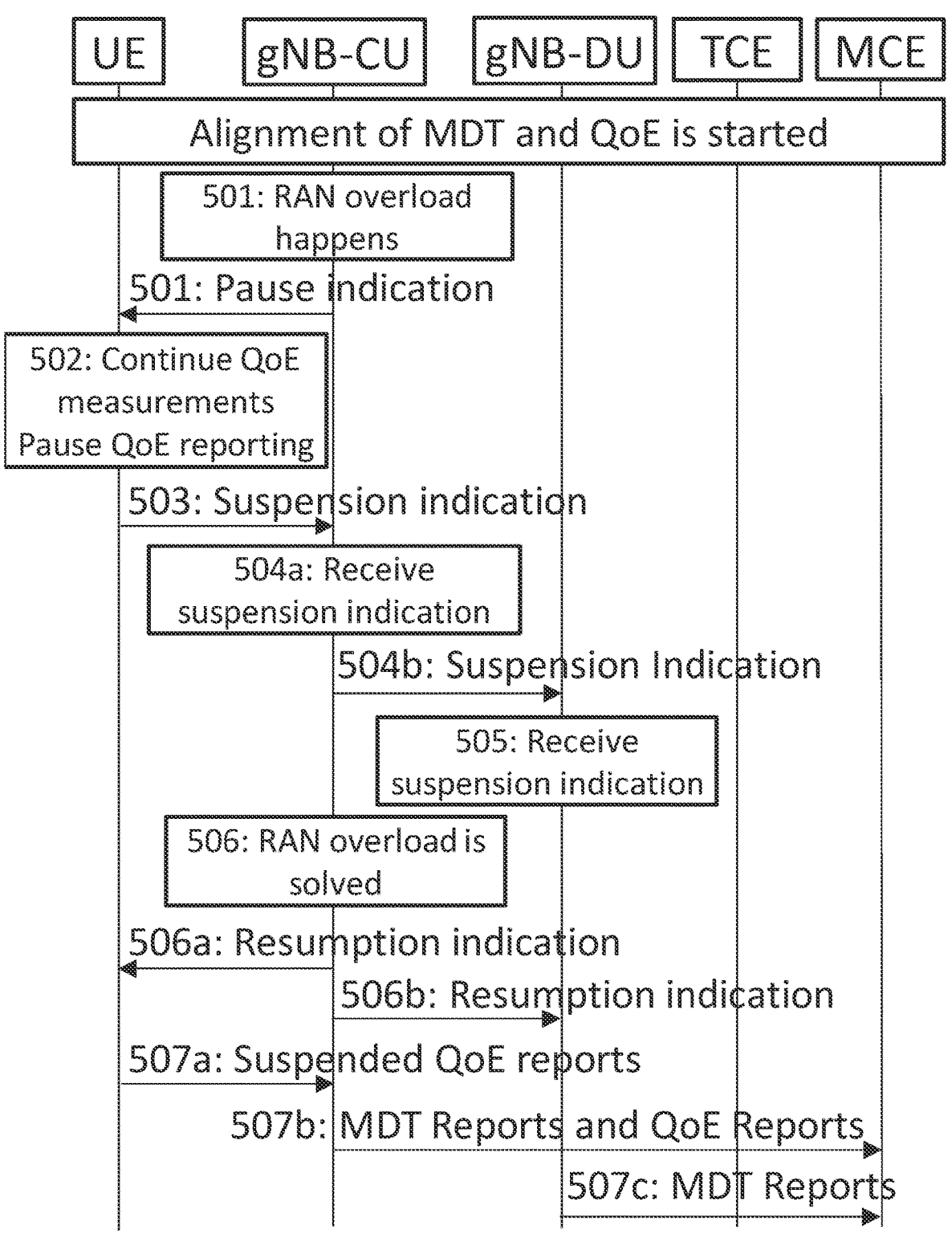
FIG. 5 shows a schematic diagram of a process according to an embodiment of the present disclosure.

FIG. 5 shows a schematic diagram of an alignment of the MDT and the QoE (measurements) in a CU-DU split architecture (configuration) according to an embodiment of the present disclosure. In this embodiment, the QoE (reporting) may be paused.

In FIG. 5, the alignment of the MDT and the QoE is started/enabled/triggered. That is, the gNB-CU and/or the gNB-DU transmits the MDT reports to the MCE. The gNB-CU may further transmit the QoE reports to the MCE together with the MDT reports.

Step 501: The gNB-CU detects a RAN overload and sends a pause indication to the UE, to notify UE that the RAN overload situation happens that the QoE reporting should be suspended.

Step 502: After the UE receives the pause indication from the gNB-CU, the UE continues ongoing QoE measurement(s) in the application layer and the QoE reporting at the AS layer is suspended.

Step 503: When or after the QoE reporting is suspended at the AS layer, the UE sends an RRC layer message to the gNB-CU, to indicate the suspension of the QoE reporting in the UE AS layer.

Step 504*a*: After the gNB-CU receives the suspension indication from the UE, the gNB-CU continues sending the MDT reports to the TCE and suspends the reporting of MDT measurement results to the MCE.

Step 504*b*: The gNB-CU sends, to the gNB-DU, an indication associated with the suspension of the QoE reporting through an F1 application protocol (F1AP).

Step 505: After the gNB-DU receives the indication from gNB-CU, gNB-DU continues the MDT reporting to TCE but suspends the MDT reporting to MCE.

Step 506: After a certain period, the RAN overload situation is solved.

Step 506*a*: The gNB-CU sends a resume indication to the UE, to ask UE to transmit the suspended QoE reports.

Step 506*b*: The gNB-CU sends a resumption indication associated with the resumption of the QoE reporting to the gNB-DU via an F1AP message.

Step 507*a*: After the UE receives the resume indication from the gNB-CU, the UE sends the suspended QoE reports to the gNB-CU. The gNB-CU sends the MDT reports together with the received QoE reports to the MCE. Note that the MDT reports and the QoE reports comprises time information added based on the same clock.

Step 507*b*: After the gNB-DU receives the resume indication from the gNB-CU, the gNB-DU resumes the MDT reporting (i.e. transmitting the MDT reports) to the MCE.

Figure 6:
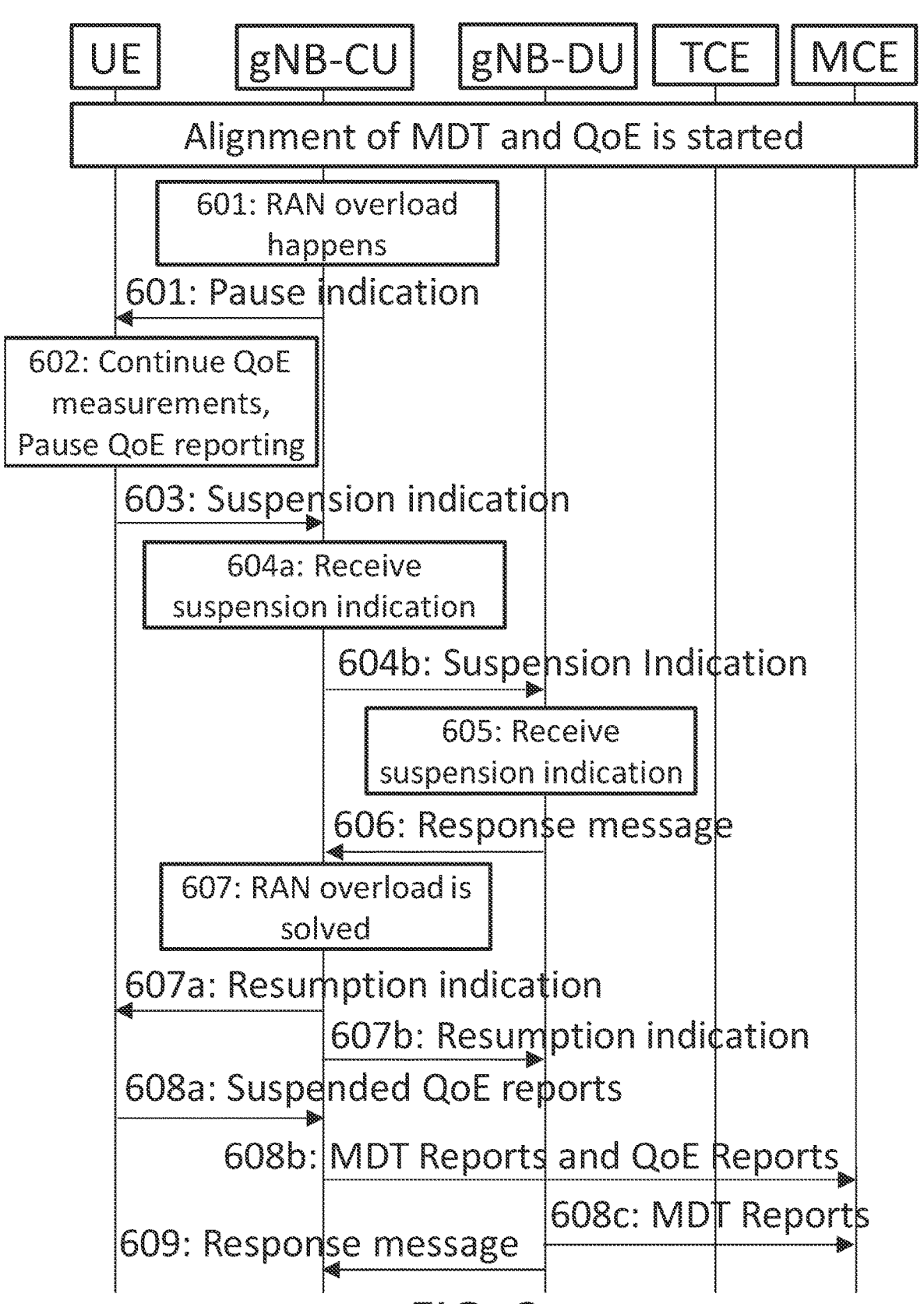
FIG. 6 shows a schematic diagram of a process according to an embodiment of the present disclosure.

FIG. 6 shows a schematic diagram of an alignment of the MDT and the QoE (measurements) in a CU-DU split architecture (configuration) according to an embodiment of the present disclosure. In this embodiment, the QoE (reporting) may be paused.

In FIG. 6, the alignment of the MDT and the QoE is started/enabled/triggered. That is, the gNB-CU and/or the gNB-DU transmits the MDT reports to the MCE. The gNB-CU may further transmit the QoE reports to the MCE together with the MDT reports.

Step 601: The gNB-CU detects a RAN overload and sends a pause indication to the UE, to notify the UE of that the RAN overload situation happens that the QoE reporting should be suspended.

Step 602: After the UE receives the pause indication from the gNB-CU, the UE continues ongoing QoE measurement(s) in the application layer and the QoE reporting at the AS layer are suspended.

Step 603: When or after the QoE reporting is suspended at the AS layer, the UE sends an RRC layer message to the gNB-CU, to indicate the suspension of the QoE reporting in the UE AS layer.

Step 604*a*: After the gNB-CU receives the suspension indication from the UE, the gNB-CU continues sending the MDT reports to the TCE and suspends the reporting of MDT measurement results to the MCE.

Step 604*b*: The gNB-CU sends, to the gNB-DU, an indication associated with the suspension of the QoE reporting through an F1 application protocol (F1AP).

Step 605: After the gNB-DU receives the indication from the gNB-CU, the gNB-DU continues the MDT reporting to TCE but suspends the MDT reporting to MCE.

Step 606: The gNB-DU sends an F1AP message to the gNB-CU as a response message, to notify the gNB-CU of that the MDT reporting to the MCE has been suspended.

Step 607: After a certain period, the RAN overload situation is solved.

Step 607*a*: The gNB-CU sends a resume indication to the UE, to ask the UE to transmit the suspended QoE reports.

Step 607*b*: The gNB-CU sends a resumption indication associated with the resumption of the QoE reporting to the gNB-DU via an F1AP message.

Step 608*a*: After the UE receives the resume indication from the gNB-CU, the UE sends the suspended QoE reports to the gNB-CU. The gNB-CU sends the MDT reports together with the received QoE reports to the MCE. Note that the MDT reports and the QoE reports comprise time information added based on the same clock.

Step 608*b*: After the gNB-DU receives the resume indication from the gNB-CU, the gNB-DU resumes the MDT reporting (i.e. transmitting the MDT reports) to the MCE.

Step 609: The gNB-DU sends a response message to the gNB-CU via the F1AP, to notify the gNB-CU of the resumption of the MDT reporting to the MCE.

Figure 7:
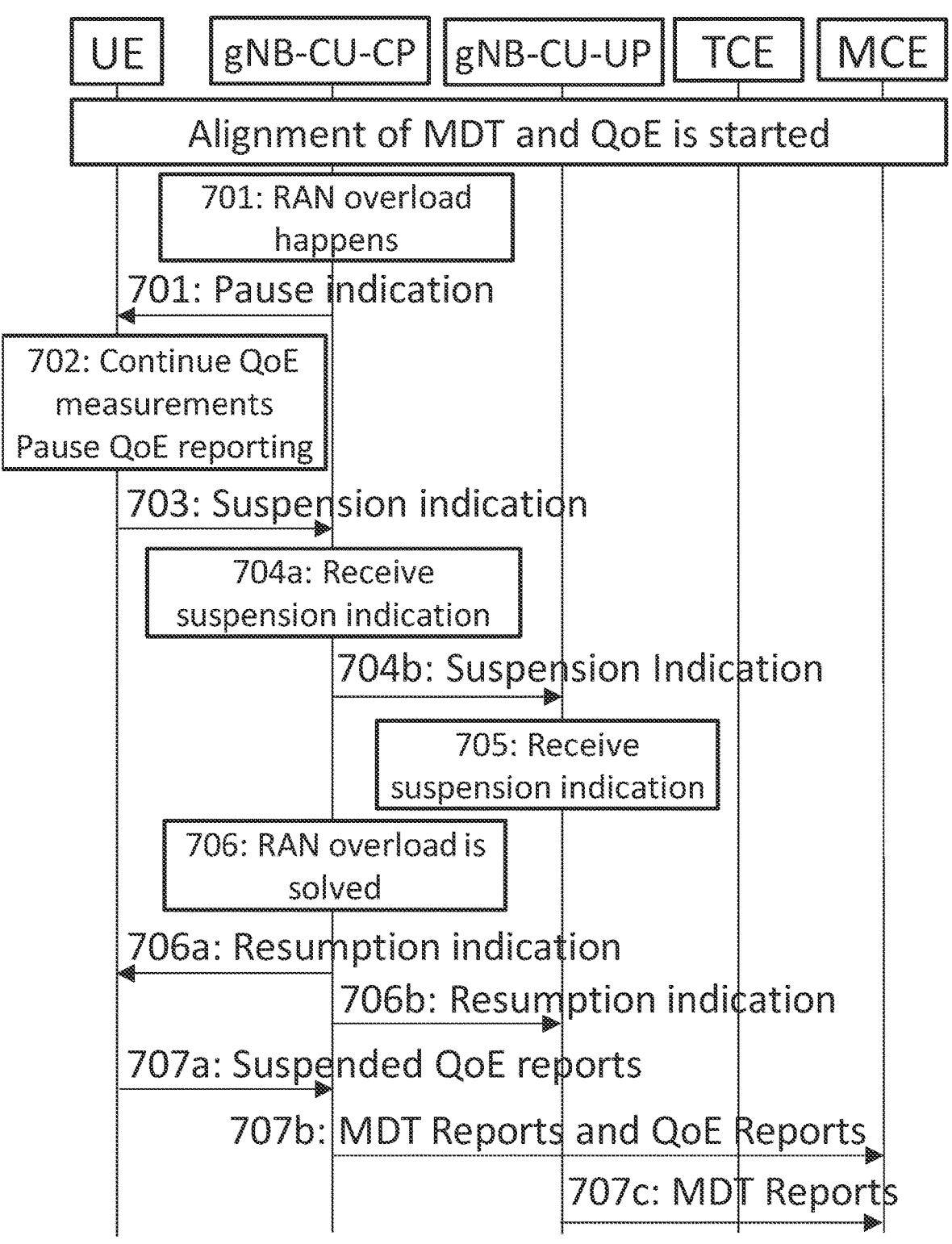
FIG. 7 shows a schematic diagram of a process according to an embodiment of the present disclosure.

FIG. 7 shows a schematic diagram of an alignment of the MDT and the QoE (measurements) in a CP-UP split architecture (configuration) according to an embodiment of the present disclosure. In this embodiment, the QoE (reporting) may be paused.

In FIG. 7, the alignment of the MDT and the QoE is started/enabled/triggered. That is, the gNB-CU-CP and/or the gNB-CU-UP transmits the MDT reports to the MCE. The gNB-CP may further transmit the QoE reports to the MCE together with the MDT reports.

Step 701: The gNB-CU-CP detects a RAN overload and sends a pause indication to the UE, to notify the UE that the RAN overload happens in the RAN node and the QoE reporting should be suspended.

Step 702: After the UE receives the pause indication from the gNB-CU-CP, the UE continues the ongoing QoE measurements in the application layer. Note that the QoE reporting at the AS layer is suspended.

Step 703: When or after the QoE reporting at the AS layer is suspended, the UE sends an indication to the gNB-CU-CP, to notify the suspension of the QoE reporting in the UE AS layer.

Step 704*a*: After receiving the suspension indication of the QoE reporting from the UE, the gNB-CU-CP continues sending the MDT reports to the TCE and suspends the MDT reporting to the MCE.

Step 704*b*: The gNB-CU-CP sends, to the gNB-CU-UP, a suspension indication associated with the suspension of the QoE reporting through an E1 application protocol (E1AP).

Step 705: After the gNB-CU-UP receiving the indication from gNB-CU-CP, the gNB-CU-UP continues the MDT reporting to the TCE and suspends the MDT reporting to the MCE.

Step 706: After a certain period, the RAN overload situation is solved.

Step 706*a*: The gNB-CU-CP sends a resumption indication to the UE, to ask the UE to transmit the suspended QoE reports.

Step 706*b*: The gNB-CU-CP sends a resumption indication about the resumption of the QoE reporting to the gNB-CU-UP via an E1AP message.

Step 707*a*: After the UE receives the resume indication from gNB-CU-CP, the UE sends the suspended QoE reports to the gNB-CU-CP. The gNB-CU-CP sends the MDT reports together and the QoE reports to the MCE, wherein the MDT reports and the QoE reports are transmitted with the time information added based on the same clock.

Step 707*b*: After the gNB-CU-UP receives the resume indication from the gNB-CU-CP, the gNB-CU-UP resumes the MDT reporting to the MCE.

Figure 8:
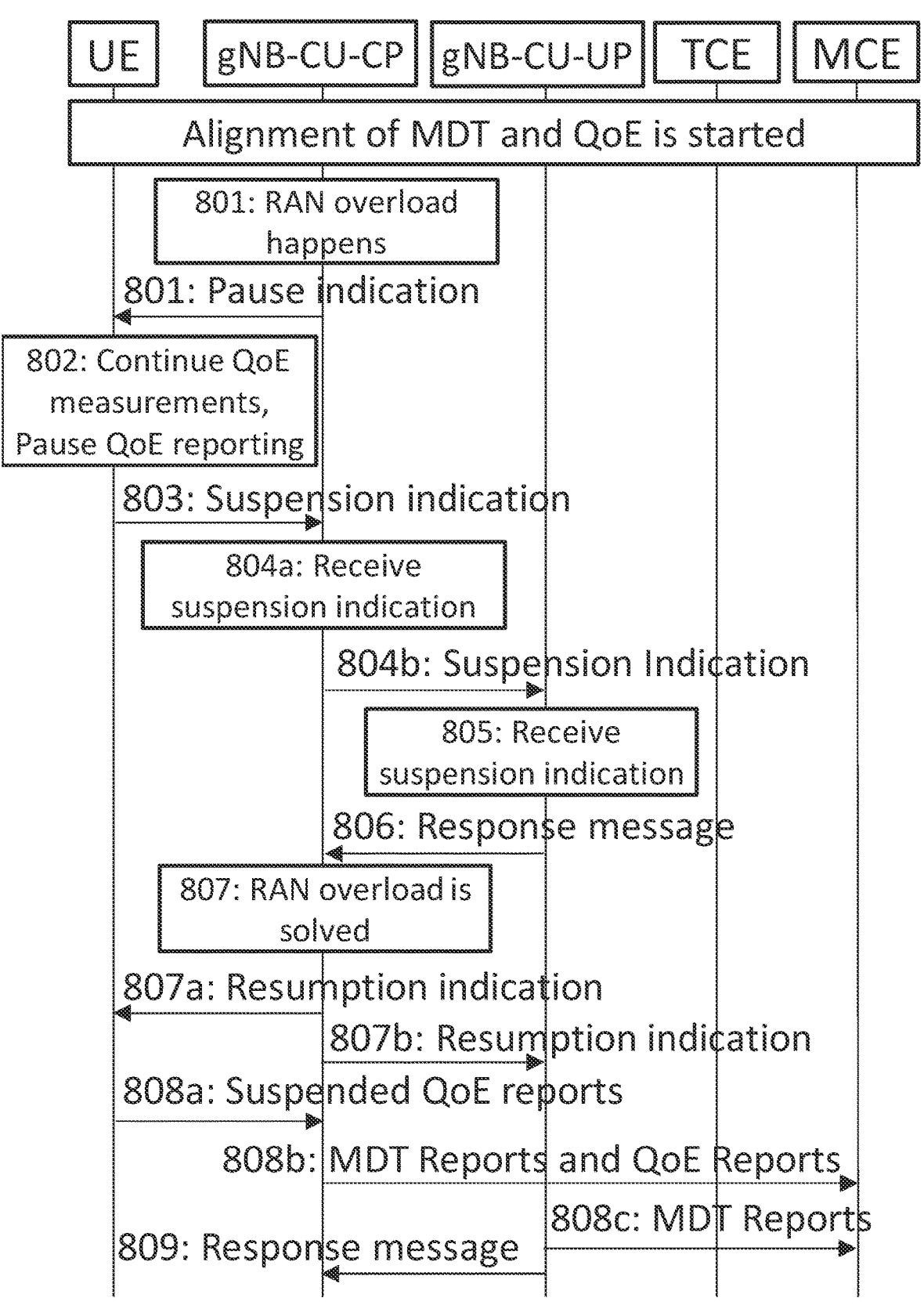
FIG. 8 shows a schematic diagram of a process according to an embodiment of the present disclosure.

FIG. 8 shows a schematic diagram of an alignment of the MDT and the QoE (measurements) in a CP-UP split architecture (configuration) according to an embodiment of the present disclosure. In this embodiment, the QoE (reporting) may be paused.

In FIG. 8, the alignment of the MDT and the QoE is started/enabled/triggered. That is, the gNB-CU-CP and/or the gNB-CU-UP transmits the MDT reports to the MCE. The gNB-CP may further transmit the QoE reports to the MCE together with the MDT reports.

Step 801: The gNB-CU-CP detects a RAN overload and sends a pause indication to the UE, to notify the UE of that the RAN overload happens in the RAN node and the QoE reporting should be suspended.

Step 802: After the UE receives the pause indication from the gNB-CU-CP, the UE continues the ongoing QoE measurements in the application layer. Note that the QoE reporting at the AS layer is suspended.

Step 803: When or after the QoE reporting at the AS layer is suspended, the UE sends an indication to the gNB-CU-CP, to notify of the suspension of the QoE reporting in the UE AS layer.

Step 804*a*: After receiving the suspension indication of the QoE reporting from the UE, the gNB-CU-CP continues sending the MDT reports to the TCE and suspends the MDT reporting to the MCE.

Step 804*b*: The gNB-CU-CP sends, to the gNB-CU-UP, a suspension indication associated with the suspension of the QoE reporting through the E1AP.

Step 805: After the gNB-CU-UP receiving the indication from the gNB-CU-CP, the gNB-CU-UP continues the MDT reporting to the TCE and suspends the MDT reporting to the MCE.

Step 806: The gNB-CU-UP sends an E1AP message to the gNB-CU-CP as a response message, to notify the gNB-CU-CP that the MDT reporting to MCE has been suspended.

Step 807: After certain period, the RAN overload situation is solved.

Step 807*a*: The gNB-CU-CP sends a resumption indication to the UE, to ask UE to transmit the suspended QoE reports.

Step 807*b*: The gNB-CU-CP sends a resumption indication about the resumption of the QoE reporting to the gNB-CU-UP via an E1AP message.

Step 808*a*: After the UE receives the resume indication from gNB-CU-CP, the UE sends the suspended QoE reports to the gNB-CU-CP. The gNB-CU-CP sends the MDT reports together with the QoE reports to the MCE, wherein the MDT reports and the QoE reports are transmitted with the time information added based on the same clock.

Step 808*b*: After the gNB-CU-UP receives the resume indication from the gNB-CU-CP, the gNB-CU-UP resumes the MDT reporting to the MCE.

Step 809: The gNB-CU-UP sends a response message to the gNB-CU-CP via the E1AP, to notify the gNB-CU-CP the resumption of the MDT reporting to the MCE.

Figure 9:
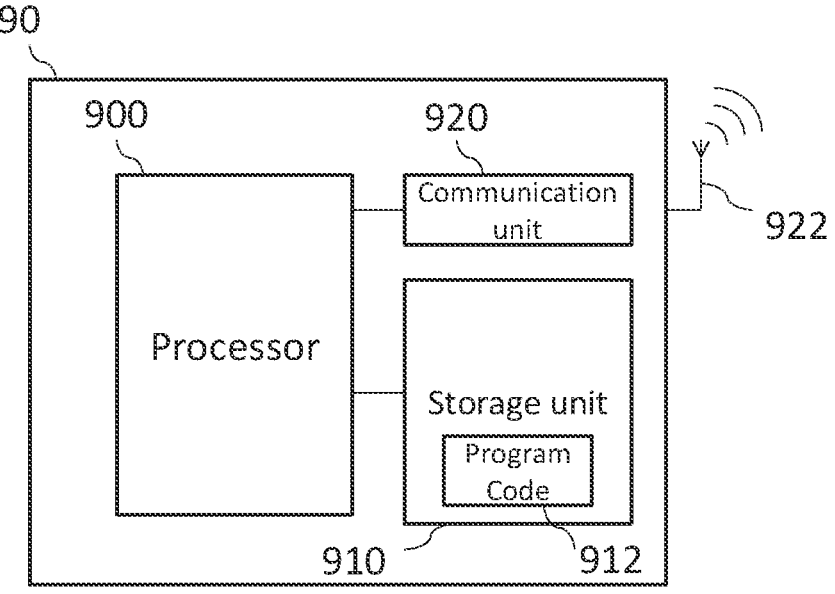
FIG. 9 shows an example of a schematic diagram of a wireless terminal according to an embodiment of the present disclosure.

FIG. 9 relates to a schematic diagram of a wireless terminal 90 according to an embodiment of the present disclosure. The wireless terminal 90 may be a user equipment (UE), a mobile phone, a laptop, a tablet computer, an electronic book or a portable computer system and is not limited herein. The wireless terminal 90 may include a processor 900 such as a microprocessor or Application Specific Integrated Circuit (ASIC), a storage unit 910 and a communication unit 920. The storage unit 910 may be any data storage device that stores a program code 912, which is accessed and executed by the processor 900. Embodiments of the storage unit 912 include but are not limited to a subscriber identity module (SIM), read-only memory (ROM), flash memory, random-access memory (RAM), hard-disk, and optical data storage device. The communication unit 920 may a transceiver and is used to transmit and receive signals (e.g. messages or packets) according to processing results of the processor 900. In an embodiment, the communication unit 920 transmits and receives the signals via at least one antenna 922 shown in FIG. 9.

In an embodiment, the storage unit 910 and the program code 912 may be omitted and the processor 900 may include a storage unit with stored program code. The processor 900 may implement any one of the steps in exemplified embodiments on the wireless terminal 90, e.g., by executing the program code 912. The communication unit 920 may be a transceiver. The communication unit 920 may as an alternative or in addition be combining a transmitting unit and a receiving unit configured to transmit and to receive, respectively, signals to and from a wireless network node (e.g. a base station).

Figure 10:
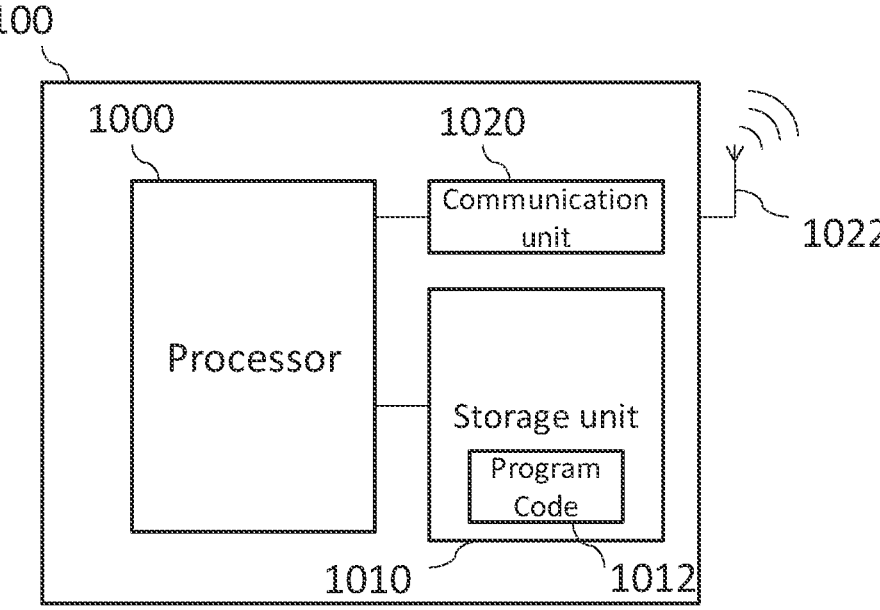
FIG. 10 shows an example of a schematic diagram of a wireless network node according to an embodiment of the present disclosure.

FIG. 10 relates to a schematic diagram of a wireless network node 100 according to an embodiment of the present disclosure. The wireless network node 100 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU), a gNB-CU control plane (gNB-CU-CP), a gNB-CU user plane (gNB-CU-UP), a data network, a core network or a Radio Network Controller (RNC), and is not limited herein. In addition, the wireless network node 100 may comprise (perform at least part of functionalities of) at least one network function such as an access and mobility management function (AMF), a session management function (SMF), a user place function (UPF), a policy control function (PCF), an application function (AF), etc. The wireless network node 100 may include a processor 1000 such as a microprocessor or ASIC, a storage unit 1010 and a communication unit 1020. The storage unit 1010 may be any data storage device that stores a program code 1012, which is accessed and executed by the processor 1000. Examples of the storage unit 1012 include but are not limited to a SIM, ROM, flash memory, RAM, hard-disk, and optical data storage device. The communication unit 1020 may be a transceiver and is used to transmit and receive signals (e.g. messages or packets) according to processing results of the processor 1000. In an example, the communication unit 1020 transmits and receives the signals via at least one antenna 1022 shown in FIG. 10.

In an embodiment, the storage unit 1010 and the program code 1012 may be omitted. The processor 1000 may include a storage unit with stored program code. The processor 1000 may implement any steps described in exemplified embodiments on the wireless network node 100, e.g., via executing the program code 1012.

The communication unit 1020 may be a transceiver. The communication unit 1020 may as an alternative or in addition be combining a transmitting unit and a receiving unit configured to transmit and to receive, respectively, signals to and from a wireless terminal (e.g. a user equipment or another wireless network node).

Figure 11:
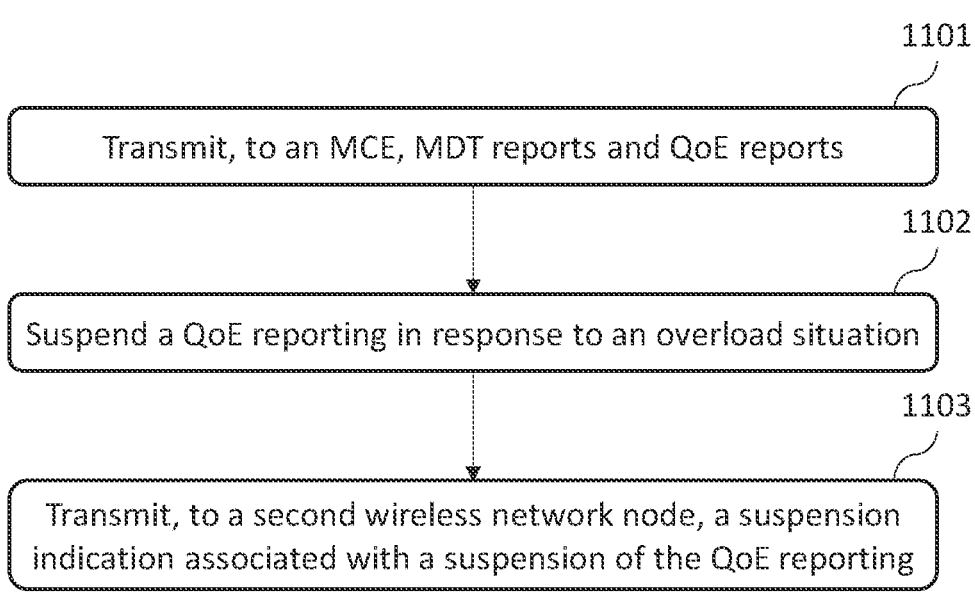
FIG. 11 shows a flowchart of a method according to an embodiment of the present disclosure.

FIG. 11 shows a flowchart of a method according to an embodiment of the present disclosure. The method shown in FIG. 11 may be used in a first wireless network and comprises the following steps:

Step 1101: Transmit, to an MCE, MDT reports and QoE reports.

Step 1102: Suspend a QoE reporting in response to an overload situation.

Step 1103: Transmit, to a second wireless network node, a suspension indication associated with a suspension of the QoE reporting.

In FIG. 11, the first wireless network node transmits MDT reports and QoE reports to an MCE. That is, (a function of) alignment of the MDT reports and the QoE reports is enabled/triggered/started in the first wireless network node. In this embodiment, the first wireless network node suspends a QoE reporting (i.e. stops transmitting the QoE reports or reporting the QoE measurement results) in response to (detecting) an overload situation (e.g. RAN overload). Under such conditions, the first wireless network node transmits a suspension indication associated with a suspension of the QoE reporting to a second wireless network node, to indicate/instruct the second wireless network node to stop transmitting MDT reports to the MCE.

In an embodiment, the first wireless network node receives a response message associated with a suspension of transmitting the MDT reports to the MCE from the second wireless network node.

In an embodiment, the first wireless network node resumes the QoE reporting, e.g., when the overload situation is solved. The first wireless network node transmits a resumption indication associated a resumption of the QoE reporting to the second wireless network node, to indicate/instruct the second wireless network node to transmit the MDT reports to the MCE. In this embodiment, the first wireless network node may receive a response message associated with a resumption of transmitting the MDT reports to the MCE from the second wireless network node.

In an embodiment, the first wireless network node is one of the MN and the SN of the DC architecture/configuration and the second wireless network node is another one of the MN and the SN of the DC architecture. In this embodiment, the first wireless network node may receive an indication associated with the alignment of the MDT reports and the QoE reports from a core network entity (e.g. OAM and/or CN). In an embodiment, the indication comprises at least one of:

an MDT trace ID associated with the MDT reports, or at least one type of measurement results (needed to be) comprised in the MDT reports.

In other words, the indication indicates the MDT reports needed to be transmitted to the MCE and/or the type(s) of measurement results (needed to be) comprised in the transmitted MDT reports.

Based on (or in response to) the indication, the first wireless network node transmits assistance information associated with the alignment of the MDT reports and the QoE reports to the second wireless network node. For example, the assistance information may comprise information of transmitting the MDT reports to the MCE. In an embodiment, the assistance information comprises at least one of:

an MDT trace ID associated with the MDT reports, at least one type of measurement results (needed to be) comprised in the MDT reports, an (IP) address of the MCE.

That is the assistance information may indicate the MDT reports needed to be transmitted to the MCE and/or the type(s) of measurement results (needed to be) comprised in the transmitted MDT reports and/or the (IP) address to which the MDT reports are transmitted.

In an embodiment, the type(s) of measurement results (needed to be) comprised in the transmitted MDT reports comprises at least one of:

at least one downlink (DL) signal quantity (measurement result), a power headroom (measurement result), a packet data convergence protocol (PDCP) service data unit (SDU) data volume (measurement result), a packet delay (measurement result), a packet loss rate (measurement result), a received signal strength indicator (RSSI) (measurement result), or a round trip time (RTT) (measurement result).

In an embodiment, the first wireless network node is a CU of a RAN node (e.g. gNB-CU) and the second wireless network node is a DU of the RAN node (e.g. gNB-DU).

In an embodiment, the first wireless network node is a CP in a CU of a RAN node (e.g. gNB-CU-CP) and the second wireless network node is a UP in the CU of the RAN node (e.g. gNB-CU-UP).

Figure 12:
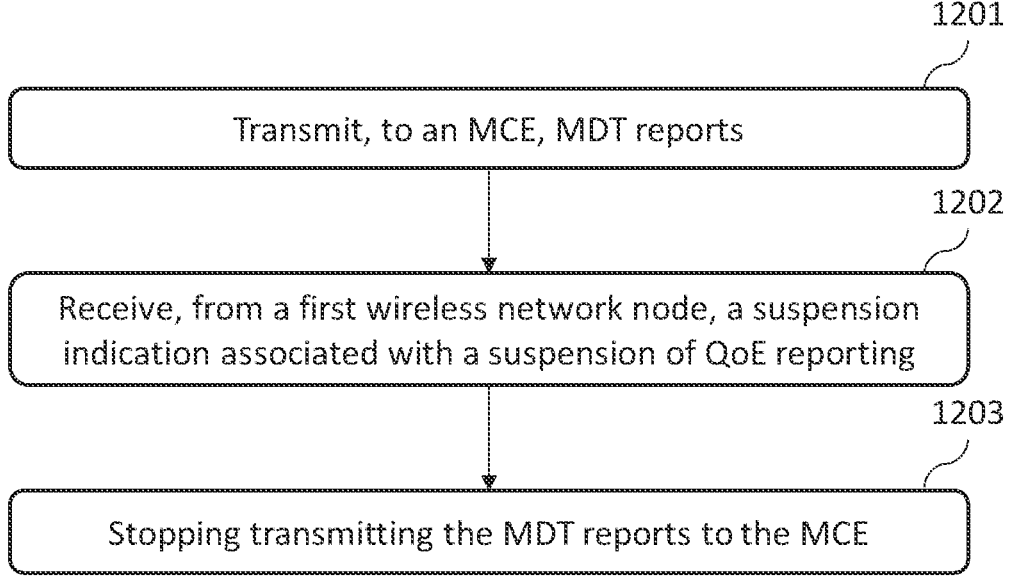
FIG. 12 shows a flowchart of a method according to an embodiment of the present disclosure.

FIG. 12 shows a flowchart of a method according to an embodiment of the present disclosure. The method shown in FIG. 12 may be used in a second wireless network node and comprises the following steps:

Step 1201: Transmit, to an MCE, MDT, reports.

Step 1202: Receive, from a first wireless network node, a suspension indication associated with a suspension of QoE reporting.

Step 1203: Stopping transmitting the MDT reports to the MCE.

In FIG. 12, the second wireless network node transmits MDT reports to an MCE. That is (a function of) alignment of the MDT reports and QoE reports is enabled/triggered/stated at the second wireless network node. In this embodiment, the second wireless network node receives a suspension indication associated with a suspension of QoE reporting. Based on the suspension indication, the second wireless network node stops transmitting the MDT reports to the MCE. In an embodiment, the second wireless network node transmits a response message associated with a suspension of transmitting the MDT reports to the MCE to the first wireless network node.

In an embodiment, the second wireless network node receives a resumption indication associated with a resumption of the QoE reporting from the first wireless network node. The second wireless network node resumes/starts transmitting the MDT reports to the MCE (based on the resumption indication). In this embodiment, the second wireless network node may further transmit a response message associated with a resumption of transmitting the MDT reports to the MCE.

In an embodiment, the first wireless network node is one of the MN and the SN of the DC architecture/configuration and the second wireless network node is another one of the MN and the SN of the DC architecture. In this embodiment, the second wireless network node may receive, from the first wireless network node, assistance information associated with the alignment of the MDT reports and the QoE reports. For example, the assistance information may comprise information of transmitting the MDT reports to the MCE. In an embodiment, the assistance information comprises at least one of:

an MDT trace ID associated with the MDT reports,
at least one type of measurement results (needed to be)
    comprised in the MDT reports,
an (IP) address of the MCE.

That is the assistance information may indicate the MDT reports needed to be transmitted to the MCE and/or the type(s) of measurement results (needed to be) comprised in the transmitted MDT reports and/or the (IP) address to which the MDT reports are transmitted.

In an embodiment, the type(s) of measurement results (needed to be) comprised in the transmitted MDT reports comprises at least one of:

a DL signal quantities (measurement result),
a power headroom (measurement result),
a PDCP SDU data volume (measurement result),
a packet delay (measurement result),
a packet loss rate (measurement result),
an RSSI (measurement result), or
an RTT (measurement result).

In an embodiment, the first wireless network node is a CU of a RAN node (e.g. gNB-CU) and the second wireless network node is a DU of the RAN node (e.g. gNB-DU).

In an embodiment, the first wireless network node is a CP in a CU of a RAN node (e.g. gNB-CU-CP) and the second wireless network node is a UP in the CU of the RAN node (e.g. gNB-CU-UP).

FIG. 13 shows a flowchart of a method according to an embodiment of the present disclosure. The method shown in FIG. 13 may be used in a first wireless network node and comprises the following steps:

Step 1301: Receive, from a core network entity, an indication associated with an alignment of MDT reports and QoE reports.

Step 1302: Transmit, to a second wireless network node, assistance information associated with the alignment of the MDT reports and the QoE reports.

In this embodiment, the first wireless network node receives an indication associated with an alignment of MDT reports and QoE reports from a core network entity (e.g. OAM, CN). Based on the indication, the first wireless network node acknowledges that (a function of) the alignment of the MDT reports and the QoE reports is enabled/triggered/started. Under such conditions, the first wireless network node transmits assistance information associated with the alignment of the MDT reports and the QoE reports to a second wireless network node, to indicate/instruct the second wireless network node to transmit the MDT reports to an MCE. In this embodiment, the first wireless network node is one of the MN and the SN of the DC architecture/configuration and the second wireless network node is another one of the MN and the SN of the DC architecture.

In an embodiment, the indication comprises at least one of:

an MDT trace ID associated with the MDT reports, or
at least one type of measurement results (needed to be)
    comprised in the MDT reports.

In other words, the indication indicates the MDT reports (needed to be) transmitted to the MCE and/or the type(s) of measurement results needed to be comprised in the transmitted MDT reports.

In an embodiment, the assistance information may be associated with and/or comprise information of transmitting the MDT reports to the MCE. For example, the assistance information comprises at least one of:

an MDT trace ID associated with the MDT reports,
at least one type of measurement results (needed to be)
    comprised in the MDT reports, or
an (IP) address of the MCE.

That is the assistance information may indicate the MDT reports (needed to be) transmitted to the MCE and/or the type(s) of measurement results needed to be comprised in the transmitted MDT reports and/or the (IP) address to which the MDT reports are transmitted.

In an embodiment, the type(s) of measurement results (needed to be) comprised in the transmitted MDT reports comprises at least one of:

at least one DL signal quantity (measurement result),
a power headroom (measurement result),
a PDCP SDU data volume (measurement result),
a packet delay (measurement result),
a packet loss rate (measurement result),
an RSSI (measurement result), or
an RTT (measurement result).

FIG. 14 shows a flowchart of a method according to an embodiment of the present disclosure. The method shown in FIG. 14 may be used in a second wireless network node and comprises the following step:

Step 1401: Receive, from a first wireless network node, assistance information associated with an alignment of MDT reports and QoE reports.

In FIG. 14, the second wireless network node receives assistance information associated with an alignment of MDT reports and QoE reports. Based on the indication, the second wireless network node may transmit the MDT reports to an MCE. In this embodiment, the first wireless network node is one of the MN and the SN of the DC architecture/configuration and the second wireless network node is another one of the MN and the SN of the DC architecture.

In an embodiment, the assistance information may be associated with and/or comprise information of transmitting the MDT reports to the MCE. For example, the assistance information comprises at least one of:

an MDT trace ID associated with the MDT reports,
at least one type of measurement results (needed to be)
    comprised in the MDT reports, or
an (IP) address of the MCE.

That is the assistance information may indicate the MDT reports (needed to be) transmitted to the MCE and/or the type(s) of measurement results needed to be comprised in the transmitted MDT reports and/or the (IP) address to which the MDT reports are transmitted.

In an embodiment, the type(s) of measurement results (needed to be) comprised in the transmitted MDT reports comprises at least one of:

at least one DL signal quantity (measurement result),
a power headroom (measurement result),
a PDCP SDU data volume (measurement result),
a packet delay (measurement result),
a packet loss rate (measurement result),
an RSSI (measurement result),
an RTT (measurement result).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of the claims. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a first wireless network node, the method comprising:
   transmitting, to a measurement collection entity, minimization drive test (MDT) reports and quality of experience (QoE) reports;
   suspending a QoE reporting in response to an overload situation;
   transmitting, to a second wireless network node, a suspension indication associated with a suspension of the QoE reporting; and receiving, from the second wireless network node, a response message associated with a suspension of transmitting the MDT reports to the measurement collection entity.

2. The wireless communication method of claim 1, further comprising:

resuming the QoE reporting, and transmitting, to the second wireless network node, a resumption indication associated with a resumption of the QoE reporting.

3. The wireless communication method of claim 2, further comprising:

receiving, from the second wireless network node, a response message associated with a resumption of transmitting the MDT reports to the measurement collection entity.

4. The wireless communication method of claim 1, wherein the first wireless network node is one of a master node and a secondary node in a dual connectivity configuration and the second wireless network node is another one of the master node and the secondary node.

5. The wireless communication method of claim 4, further comprising:

receiving, from a core network entity, an indication associated with an alignment of the MDT reports and the QoE reports, and transmitting, to the second wireless network node, assistance information associated with the alignment of the MDT reports and the QoE reports.

6. The wireless communication method of claim 5, wherein the indication comprises at least one of:

an MDT trace identifier associated with the MDT reports, or at least one type of measurement results comprised in the MDT reports.

7. The wireless communication method of claim 6, wherein the at least one type of measurement results comprises at least one of:

at least one downlink signal quantity, a power headroom, a packet data convergence protocol service data unit data volume, a packet delay, a packet loss rate, a received signal strength indicator, or a round trip time.

8. The wireless communication method of claim 5, wherein the assistance information comprises at least one of:

an MDT trace identifier associated with the MDT reports, at least one type of measurement results comprised in the MDT reports, or an address of the measurement collection entity.

9. The wireless communication method of claim 1, wherein the first wireless network node is a centralized unit of a radio access network node and the second wireless network node is a distributed unit of the radio access network node, or wherein the first wireless network node is a control plane in a centralized unit of a radio access network node and the second wireless network node is a user plane in the centralized unit of the radio access network node.

10. A first wireless network node, comprising:

a communication unit, configured to transmit, to a measurement collection entity, minimization drive test (MDT) reports and quality of experience (QoE) reports, and a processor, configured to suspend a QE reporting in response to an overload situation, wherein the communication unit is further configured to:

transmit, to a second wireless network node, a suspension indication associated with a suspension of the QoE reporting; and receive, from the second wireless network node, a response message associated with a suspension of transmitting the MDT reports to the measurement collection entity.

11. A wireless communication method for use in a second wireless network node, the method comprising:

transmitting, to a measurement collection entity, minimization drive test (MDT) reports;

receiving, from a first wireless network node, a suspension indication associated with a suspension of quality of experience (QoE) reporting;

stopping transmitting the MDT reports to the measurement collection entity; and transmitting, to the first wireless network node, a response message associated with a suspension of transmitting the MDT reports to the measurement collection entity.

12. The wireless communication method of claim 11, further comprising:

receiving, from the first wireless network node, a resumption indication associated with a resumption of the QoE reporting, and resuming transmitting the MDT reports to the measurement collection entity.

13. The wireless communication method of claim 11, further comprising:

transmitting, to the first wireless network node, a response message associated with a resumption of transmitting the MDT reports to the measurement collection entity.

14. The wireless communication method of claim 11, wherein the first wireless network node is one of a master node and a secondary node in a dual connectivity configuration and the second wireless network node is another one of the master node and the secondary node.

15. The wireless communication method of claim 14, further comprising:

receiving, from the first wireless network node, assistance information associated with an alignment of the MDT reports and QoE reports, and wherein the MDT reports are transmitted to the measurement collection entity based on the assistance information.

16. The wireless communication method of claim 15, wherein the assistance information comprises at least one of:

an MDT trace identifier associated with the MDT reports, at least one type of measurement results comprised in the MDT reports, or an address of the measurement collection entity.

17. The wireless communication method of claim 16, wherein the at least one type of measurement results comprises at least one of:

at least one downlink signal quantity, a power headroom, a packet data convergence protocol service data unit data volume, a packet delay, a packet loss rate, a received signal strength indicator, or a round trip time.

18. The wireless communication method of claim 11, wherein the first wireless network node is a centralized unit of a radio access network node and the second wireless network node is a distributed unit of the radio access network node, or wherein the first wireless network node is a control plane in a centralized unit of a radio access network node and the second wireless network node is a user plane in the centralized unit of the radio access network node.

\* \* \* \* \*